(12) United States Patent
Park

(10) Patent No.: US 8,360,037 B2
(45) Date of Patent: Jan. 29, 2013

(54) OIL SEPARATION APPARATUS FOR BLOW-BY GAS

(75) Inventor: Sang-Hoon Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 628 days.

(21) Appl. No.: 12/539,377

(22) Filed: Aug. 11, 2009

(65) Prior Publication Data

US 2010/0122694 A1 May 20, 2010

(30) Foreign Application Priority Data

Nov. 18, 2008 (KR) .................. 10-2008-0114791

(51) Int. Cl.
*F02M 25/06* (2006.01)
(52) U.S. Cl. ...... 123/572; 123/573; 123/574; 123/41.86
(58) Field of Classification Search ......... 123/572–574, 123/41.86
See application file for complete search history.

(56) References Cited

U.S. PATENT DOCUMENTS

| | | | | |
|---|---|---|---|---|
| 3,147,099 A | * | 9/1964 | Burdock et al. | 55/344 |
| 3,182,647 A | * | 5/1965 | Bintz | 123/574 |
| 3,380,441 A | * | 4/1968 | Lewis | 123/572 |
| 3,540,423 A | * | 11/1970 | Tolles | 123/519 |
| 4,150,642 A | * | 4/1979 | Inada et al. | 123/676 |
| 4,466,247 A | * | 8/1984 | Aoki | 60/602 |
| 4,466,397 A | * | 8/1984 | Kato et al. | 123/188.14 |
| 5,460,147 A | * | 10/1995 | Bohl | 123/572 |
| 6,012,284 A | * | 1/2000 | Tanaka et al. | 60/297 |
| 6,279,556 B1 | * | 8/2001 | Busen et al. | 123/572 |
| 6,684,864 B1 | * | 2/2004 | Busen et al. | 123/572 |
| 7,011,690 B2 | * | 3/2006 | Altvater et al. | 55/312 |
| 7,406,961 B2 | * | 8/2008 | Hilpert et al. | 123/572 |
| 7,562,652 B2 | * | 7/2009 | Hommes et al. | 123/572 |
| 2002/0100465 A1 | * | 8/2002 | Pietschner | 123/572 |

FOREIGN PATENT DOCUMENTS

JP 2006-505732 A 2/2006

* cited by examiner

Primary Examiner — Nathaniel Wiehe
Assistant Examiner — Tea Holbrook
(74) Attorney, Agent, or Firm — Morgan, Lewis & Bockius LLP

(57) ABSTRACT

An oil separation apparatus may include an intake housing provided with a gas inlet for the blow-by gas to be sucked therein, a plurality of cyclone which is formed as a cone, is disposed around the intake housing, is communicated with intake housing through an intake passage and separates oil from the blow-by gas, wherein a gas exit is formed to the upper side of the cyclone for discharging the blow-by gas and an oil outlet is formed to the lower side of the cyclone for discharging the separated oil, an exhaust housing cylinder which is provided with an gas outlet, is communicated with the gas exit and discharges the blow-by gas through the gas outlet and a control unit which is disposed within the intake and exhaust housing and selectively opens the intake passages according to intake pressure of the engine.

12 Claims, 6 Drawing Sheets

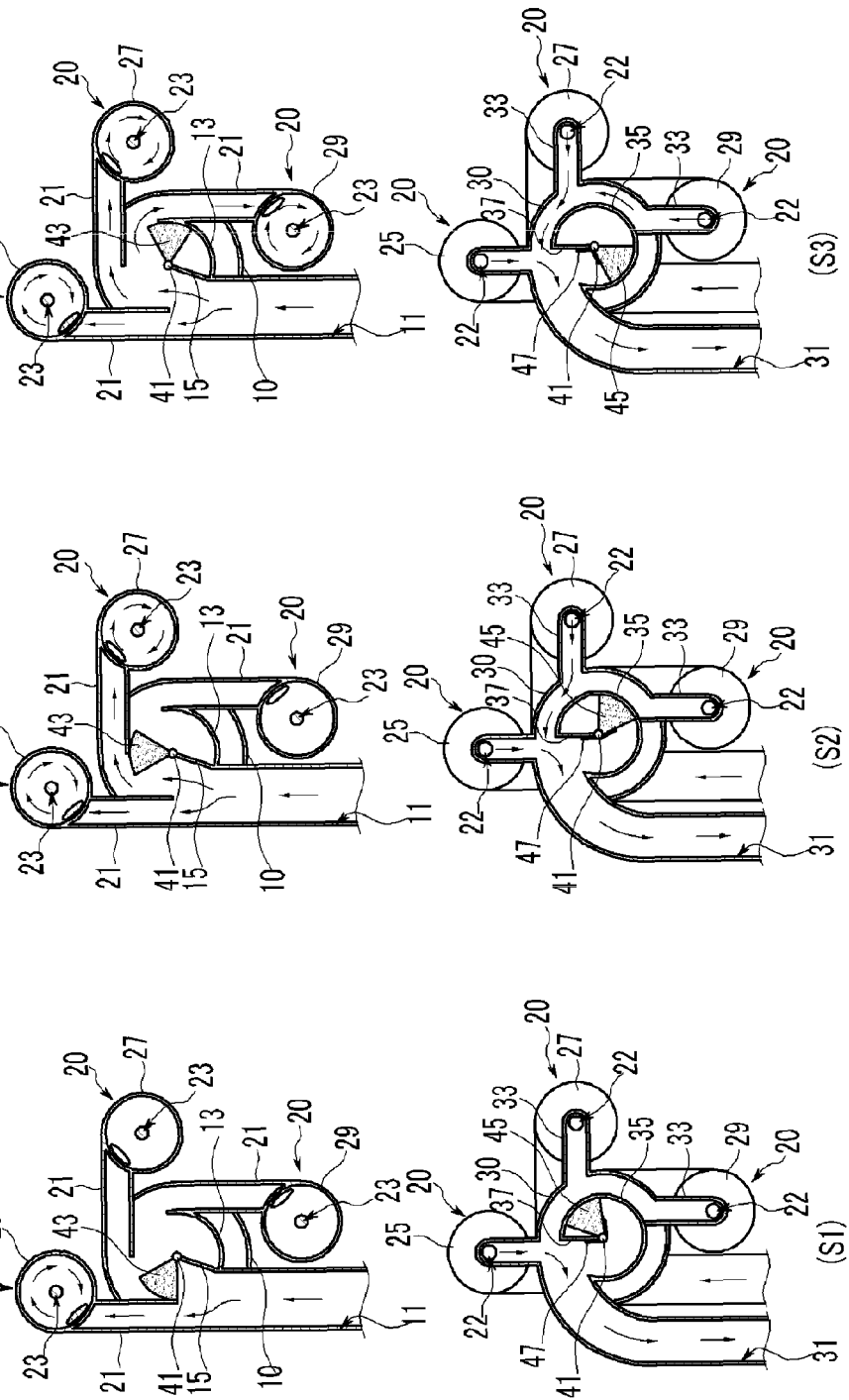

OIL SEPARATION APPARATUS FOR BLOW-BY GAS

CROSS-REFERENCE TO RELATED APPLICATION

The present application claims priority to Korean Patent Application Number 10-2008-0114791 filed on Nov. 18, 2008, the entire contents of which application is incorporated herein for all purposes by this reference.

BACKGROUND OF THE INVENTION

1. Field of the Invention

The present invention relates to an oil separation apparatus for blow-by gas. More particularly, the present invention relates to an oil separation apparatus for blow-by gas of which a number of cyclones to be used is variable according to intake pressure changes so that separation efficiency can be enhanced.

2. Description of Related Art

As well known to those skilled in the art, while an engine is running, combustion gas and unburned gas generated in compression and explosion stroke of the engine are leaked into a crankcase through a fine gap between a piston and a cylinder liner.

However, during this process, oil is mixed with the blow-by gas. As the amount of oil mixed with the blow-by gas is increased, the consumption rate of oil in the engine increases, the durability of the engine is deteriorated, and the amount of harmful exhaust gas is increased.

Especially, during compression stroke of a diesel engine using high compression ratio, high pressured gas is leaked into a crankcase so that many serious problems are caused.

To solve the above-mentioned problems, an oil separating apparatus has been proposed.

A conventional cyclone type oil separating apparatus, which obstructs flowing of blow-by gas and separates oil from the blow-by gas by impacting the gas, and a conventional filtering type oil separating apparatus, which uses an oil filter, has been largely used.

In a conventional cyclone type oil separating apparatus, however, flowing of the blow-by gas depends on an intake pressure of an engine so that uniform filtering efficiency is not expected and also filtering efficiency may easily be deteriorated.

In a conventional filtering type oil separating apparatus, an oil filter has to be replaced repeatedly and maintenance costs are increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an oil separation apparatus for blow-by gas of which a number of cyclones to be used is variable according to intake pressure changes so that separation efficiency can be enhanced.

In an aspect of the present invention, the oil separation apparatus for blow-by gas, which is connected to a crank case of an internal combustion engine, is supplied with the blow-by gas, separates oil from the blow-by gas and supplies the blow-by gas to the internal combustion engine, may include an intake housing provided with a gas inlet for the blow-by gas to be sucked therein, a plurality of cyclone which is formed as a cone, is disposed around the intake housing, is communicated with the intake housing through an intake passage respectively and separates the oil from the blow-by gas, wherein a gas exit is formed to an upper side of each cyclone for discharging the blow-by gas and an oil outlet is formed to a lower side of each cyclone for discharging the separated oil, an exhaust housing coupled to the intake housing, the exhaust housing which is provided with an gas outlet, is communicated with the gas exit through an exhaust passage connecting the gas outlet and the exhaust housing and discharges the blow-by gas through the gas outlet, and a control unit which is disposed within the intake and exhaust housing and selectively opens the intake and exhaust passages according to intake pressure of the engine.

A first end portion of the intake passage may be configured and dimensioned to be connected to the respective cyclone in a tangential direction thereof respectively.

A second end portion of the intake passage may be configured and dimensioned to be connected to the intake housing in a tangential direction thereof respectively In another aspect of the present invention, the control unit may include a rotating shaft rotatably disposed within the intake and exhaust housing, an intake diaphragm which is integrally connected to the rotating shaft and disposed within the intake housing, the intake diaphragm being configured to electively open the intake passages, an exhaust diaphragm which is integrally connected to the rotating shaft within the exhaust housing and rotates around the rotating shaft simultaneously with the rotating shaft and the intake diaphragm according to the intake pressure of the engine, the exhaust diaphragm being configured to electively open the exhaust passages, and a return spring which is disposed to the rotating shaft and supplies restoring force to the intake diaphragm and exhaust diaphragm, wherein cross sections of the intake diaphragm and exhaust diaphragm are formed by a circular arc, and the intake diaphragm is disposed in predetermined angle from the exhaust diaphragm around the rotating shaft, and wherein a mounting groove is formed to the rotating shaft for configuring the return spring.

In further another aspect of the present invention, the cyclones may include a first cyclone parallel to the gas inlet, a second cyclone vertical to the first cyclone, and a third cyclone vertical to the second cyclone, wherein the first, second and third cyclones are disposed around the intake housing, wherein a first intake passage connected to the intake housing is connected to the first cyclone in a tangential direction thereof, a second intake passage connected to the intake housing is connected to the second cyclone in a tangential direction thereof, and a third intake passage connected to the intake housing is connected to the third cyclone in a tangential direction thereof, and wherein the first, second and third intake passages are connected to the intake housing in a tangential direction thereof respectively.

A first partition, which connects the gas inlet and the intake passage connected to the third cyclone, and a second partition, which connects the gas inlet and a rotating shaft, may be formed in the intake housing.

A third partition, which is formed as a cylinder and communicated with the gas outlet, and a fourth partition, which connects a rotating shaft and a side of the third partition, may be formed in the exhaust housing.

In various aspects of the present invention, the oil separation apparatus for blow-by gas may control a number of cyclones to be used according to intake pressure changes so that separation efficiency can be enhanced, uniform separation efficiency can be expected and resistance of flowing can be reduced.

In addition, efficiency of the oil separation apparatus can be realized by slight design change in the intake diaphragm and exhaust diaphragm or modulation of spring constant of the return spring so that the oil separation apparatus is applicable to variable kind of vehicle.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 6 is a drawing showing operation states of an exemplary oil separation apparatus for blow-by gas according to the present invention according to intake pressure changes.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
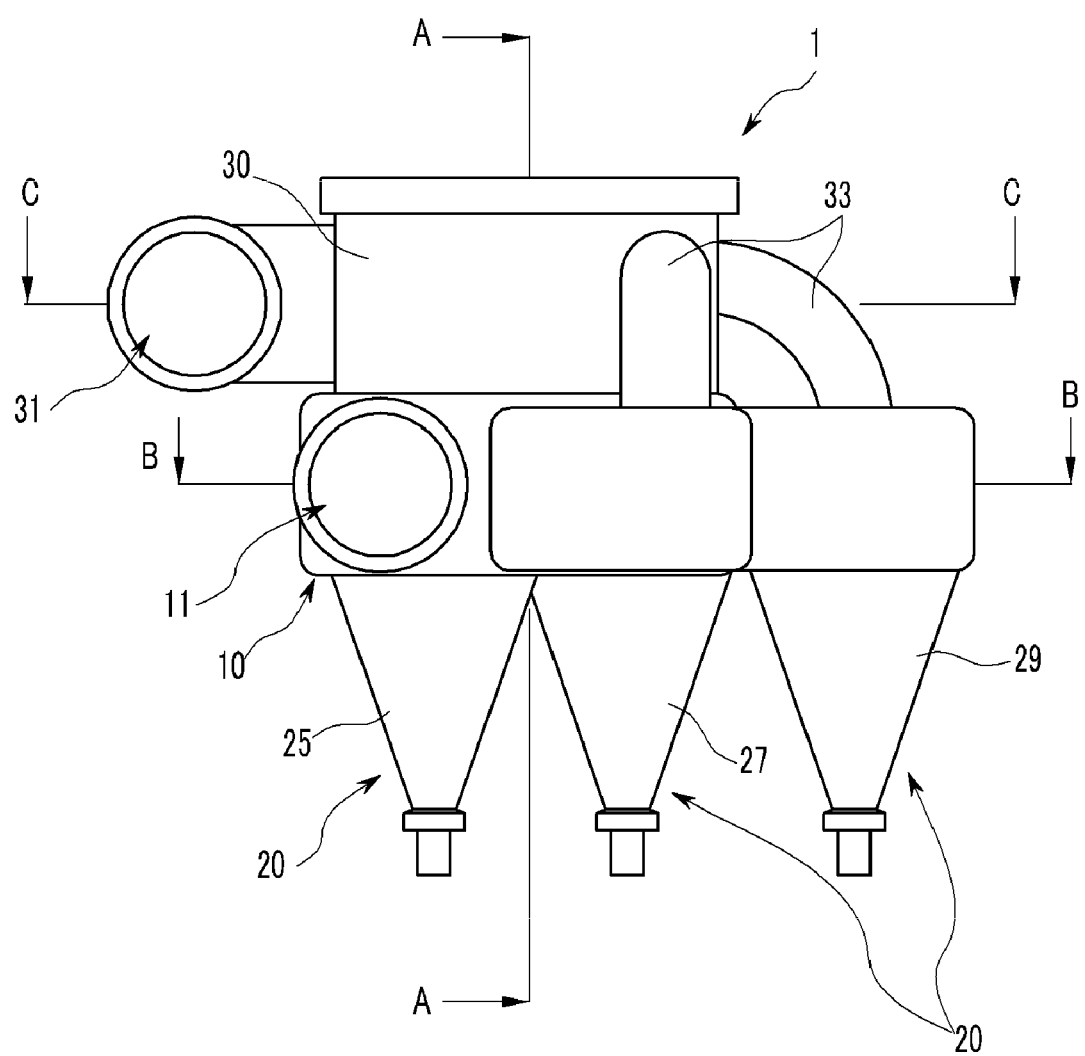
FIG. 1 is a front view of an exemplary oil separation apparatus for blow-by gas according to the present invention.
Figure 2:
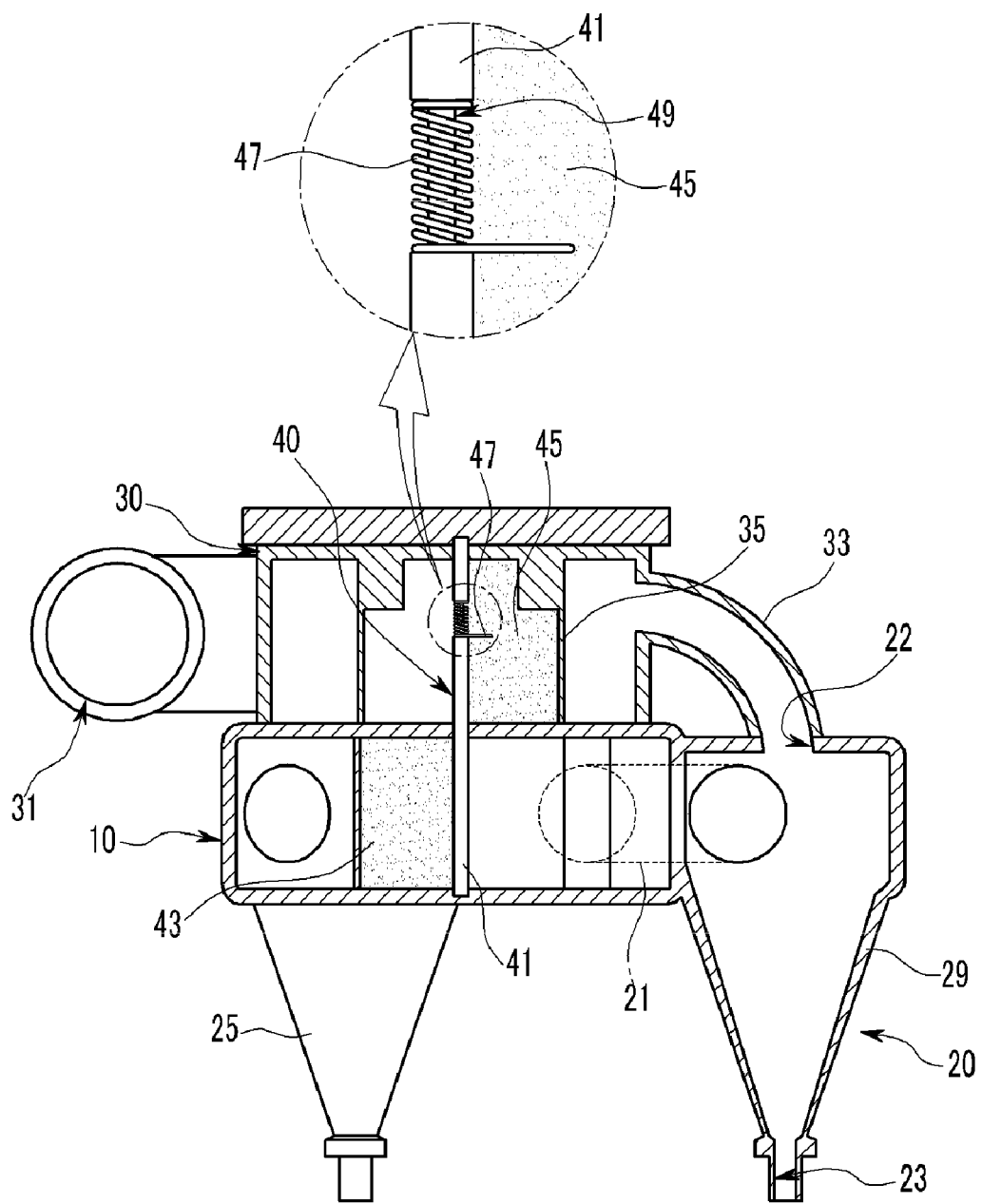
FIG. 2 is a cross-sectional view along line A-A of FIG. 1.
Figure 3:
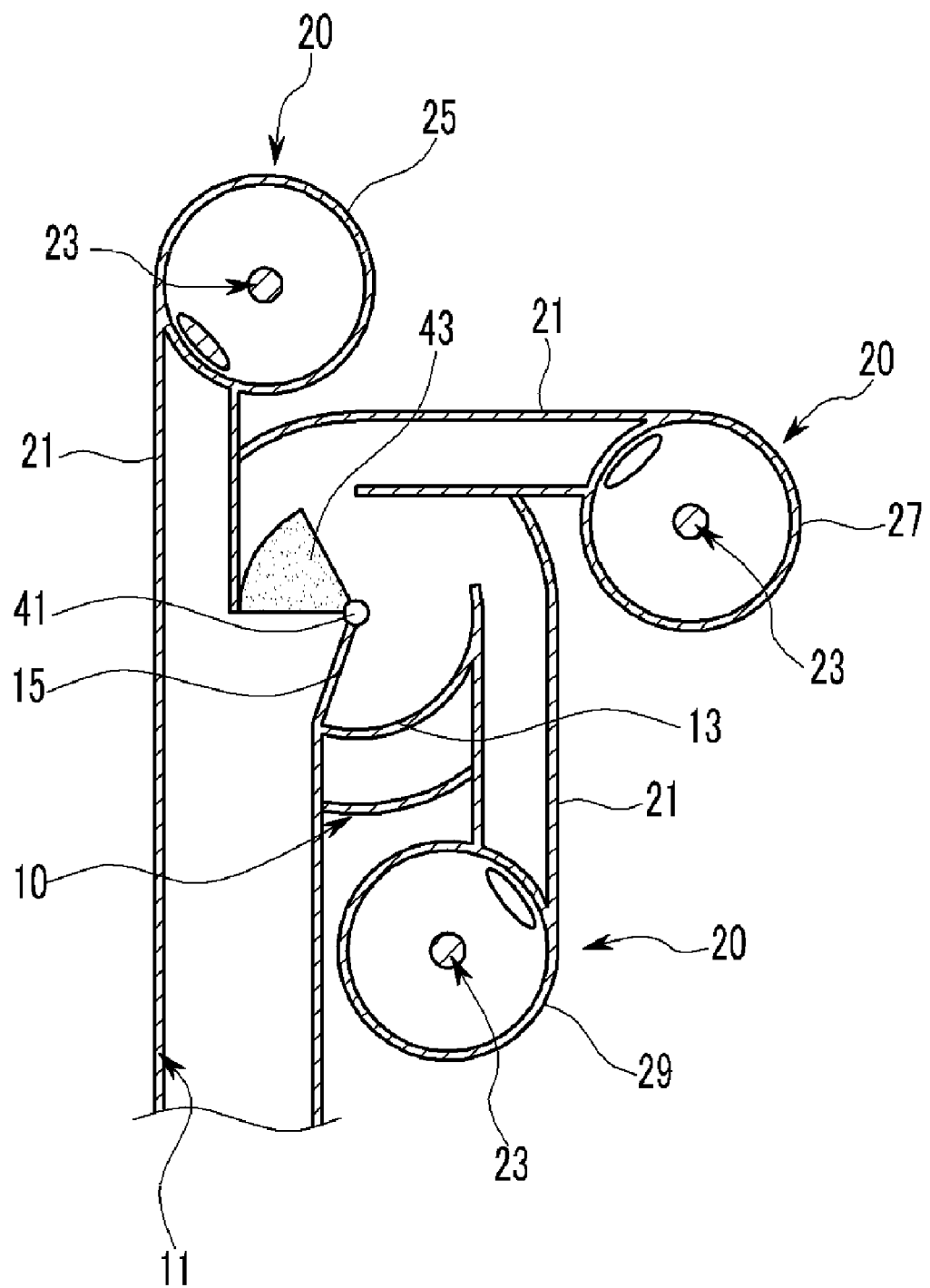
FIG. 3 is a cross-sectional view along line B-B of FIG. 1.
Figure 4:
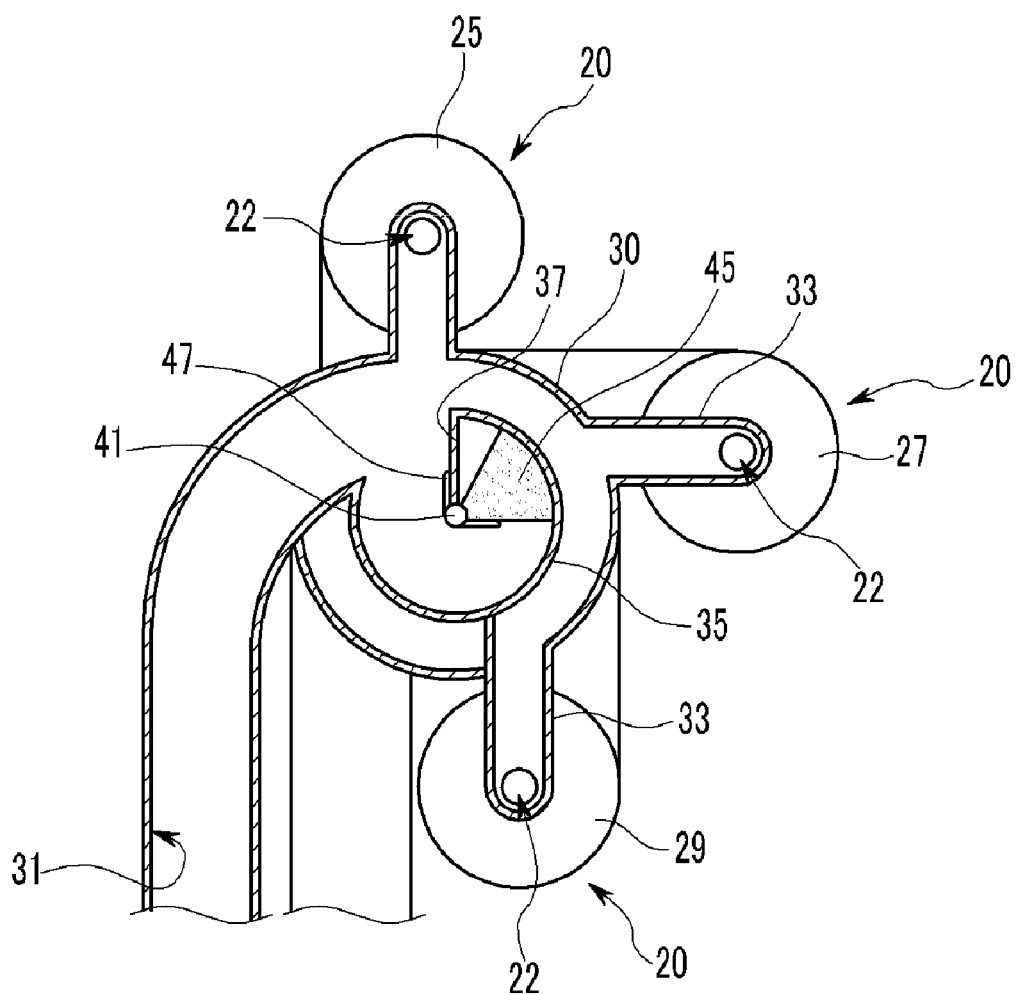
FIG. 4 is a cross-sectional view along line C-C of FIG. 1.
Figure 4:
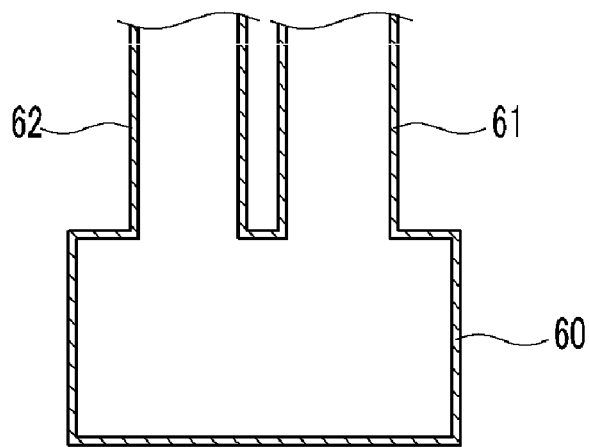

FIG. 1 is a front view of an oil separation apparatus for blow-by gas according to various embodiments of the present invention, and FIG. 2, FIG. 3 and FIG. 4 are cross-sectional views along line A-A, B-B and C-C of FIG. 1 respectively.

Referring to drawings, an oil separation apparatus 1 for blow-by gas according to various embodiments of the present invention may control a number of cyclones to be used according to intake pressure changes so that separation efficiency can be enhanced.

The oil separation apparatus 1 receives blow-by gas from a crank case 61 of an engine 60, separates oil from the blow-by gas and supplies the blow-by gas to an intake manifold 62 of the engine 60.

The oil separation apparatus 1 includes an intake housing 10, a plurality of cyclones 20, an exhaust housing 30 and a control unit 40.

The intake housing 10 is formed as a cylinder and provided with a gas inlet 11 for sucking in the blow-by gas. The cyclones 20 are formed as a cone and disposed around the intake housing 10. The cyclones 20 are communicated with the intake housing 10 via an intake passage 21 and separates oil from the blow-by gas.

A gas exit 22 is formed to an upper side of the cyclone 20 for exhausting the separated blow-by gas and an oil outlet 23 is formed a lower side of the cyclone 20 for exhausting the separated oil.

The cyclones 20 of various embodiments include a first, second, and third cyclone 25, 27, and 29. The first cyclone 25, as shown in FIG. 3, is disposed in range with the gas inlet 11.

The second cyclone 27 is disposed perpendicular to the first cyclone 25. The third cyclone 29 is disposed perpendicular to the second cyclone 27. In the intake housing 10, a first partition 13 and a second partition 15 are formed. The first partition 13 connects the gas inlet 11 and the intake passage 21 connected to the third cyclone 29. The first partition 13 forms a round. The second partition 15 connects the gas inlet 11 and a center of the intake housing 10. And the center of the intake housing 10 will be further explained later. Referring to FIG. 1 and FIG. 2, a gas outlet 31 formed as a cylinder is provided to a side of the exhaust housing 30 for exhausting the blow-by gas.

The exhaust housing 30 is connected with the gas exits 22 of the first, second, and third cyclones 25, 27, and 29 through the exhaust passage 33 and exhausts the blow-by gas separated the oil through the gas outlet 31.

Referring to FIG. 4, a third partition 35 and a fourth partition 37 are formed to a center of the exhaust housing 30. The third partition 35 is formed as a cylinder and communicated with the gas outlet 31. The fourth partition 37 connects a center of the exhaust housing 30 and a side of the third partition 35.

Referring to FIG. 2, the control unit 40 is disposed to the center of the intake and exhaust housing 10 and 30. The control unit 40 selectively opens the intake passages 21 according to the intake pressure and controls a number of cyclones of the first, second, and third cyclones 25, 27, and 29 to be operated. The control unit 40 includes a rotating shaft 41, an intake diaphragm 43, an exhaust diaphragm 45 and a return spring 47. The rotating shaft 41 is rotatably disposed to the center of the intake and exhaust housings 10 and 30 to contact the end of the second and the fourth partitions 15 and 37. The intake diaphragm 43 is integrally configured to the rotating shaft 41 in the intake housing 10. The second partition 15 connects the gas inlet 11 and the rotating shaft 41 and the fourth partition 37 connects the side of third partition 35 and the rotating shaft 41. The intake diaphragm 43 rotates with the rotating shaft 41 according to the intake pressure and selectively opens the intake passages 21.

For example, when the intake pressure is equal or larger than an atmospheric pressure, the intake diaphragm 43 is positioned original position and the blow-by gas flows into the first cyclone 25 through the intake passage 21 connected to the first cyclone 25. When the intake pressure is slightly less than the atmospheric pressure, the intake diaphragm 43 rotates with the rotating shaft 41 and opens the intake passage 21 connected with the first and the second cyclones 25 and 27 and the blow-by gas flows into the first and second cyclones 25 and 27.

When the intake pressure relatively less than the atmospheric pressure, the intake diaphragm 43 rotates further with the rotating shaft 41 and opens the intake passage 21 connected with the first, second, and third cyclones 25, 27, and 29 and the blow-by gas flows into the first, second, and third cyclones 25, 27, and 29.

Referring to FIG. 4, the exhaust diaphragm 45 is integrally configured to the rotating shaft 41 within the exhaust housing 30. The exhaust diaphragm 45 may rotate along an interior circumference of the third partition 35 with the intake diaphragm 43 and the rotating shaft 41. The intake diaphragm and exhaust diaphragms 43 and 45 are columns of which cross sections are circular arcs. And the intake diaphragm 43 is rotatably positioned around the rotating shaft 41 in a predetermined angle from the exhaust diaphragm 45.

In various embodiments, the return spring 47 is disposed to the rotating shaft 41 and one end of the return spring 47 is supported by the fourth partition 37 and the other end of the return spring 47 is supported by the exhaust diaphragm 45. The return spring 47 returns the intake diaphragm and exhaust diaphragms 43 and 45 rotated according to the intake pressure to the original position. It is preferable that the return spring 47 is a torsion spring.

Referring to FIG. 2, a mounting groove 49 is formed to the rotating shaft 41, where the exhaust diaphragm 45 is configured, for configuring the return spring.

In various embodiments of the present invention, a first end portion of the respective intake passage 21 may be configured and dimensioned to be connected to each cyclone 25, 27, and 29 in a tangential direction thereof respectively and a second end portion of the respective intake passage 21 may be configured and dimensioned to be connected to the intake housing 10 in a tangential direction thereof respectively so that the gas can be flown into cyclones without or with less amount of turbulence.

Hereinafter, operations of the oil separation apparatus according to various embodiments of the present invention will be described.

Figure 5:
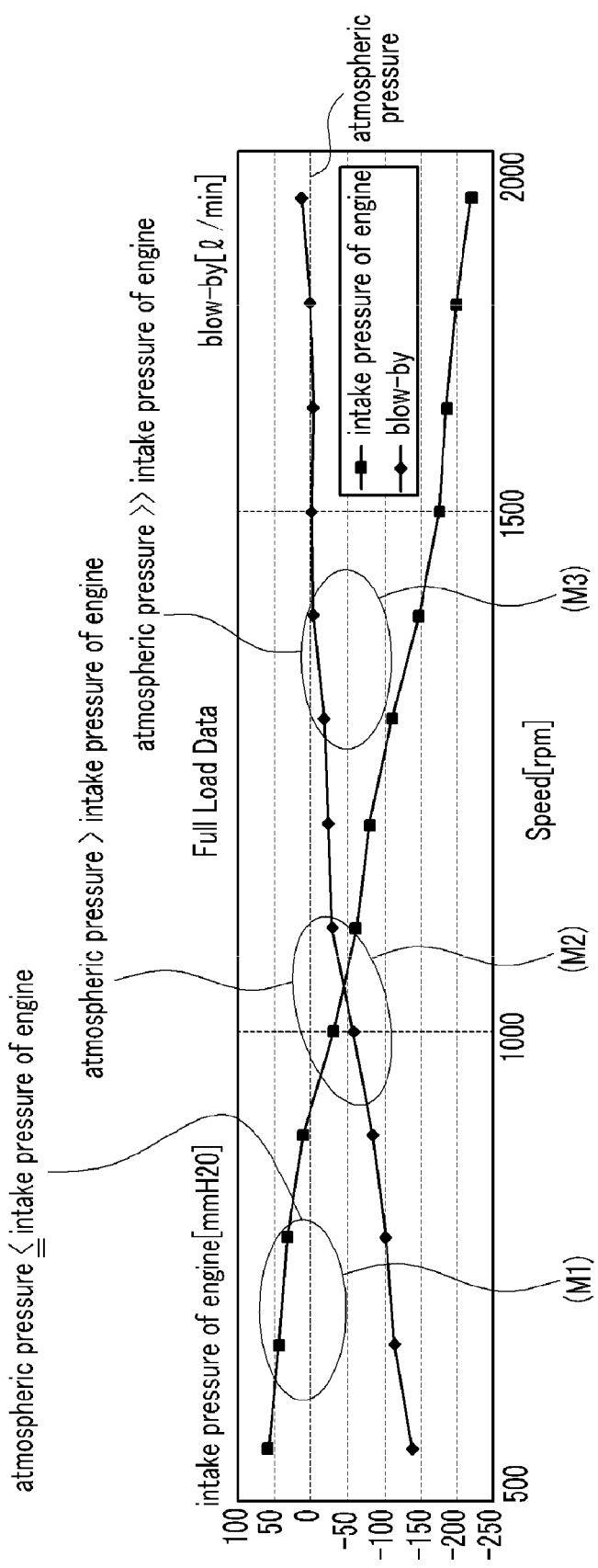
FIG. 5 is a distribution chart showing exemplary intake pressure changes and blow-by gas flowing rate change according to RPM.

FIG. 5 is a distribution chart showing intake pressure changes and blow-by gas flowing rate change according to RPM and FIG. 6 is a drawing showing operation states of an oil separation apparatus for blow-by gas according to various embodiments of the present invention according to intake pressure changes.

Referring the drawings, in the blow-by oil separation apparatus 1, a number of the operated cyclones of the first, second, and third cyclones 25, 27, and 29 are controlled by the operation of the control unit 40 according to differences between the atmospheric pressure and the intake pressure.

When the intake pressure of the engine 60 is equal or larger than an atmospheric pressure as indicated by M1 in FIG. 5, the intake diaphragm and exhaust diaphragms 43 and 45 of the control unit 40 maintain the original position as shown S1 of the FIG. 6.

Then, the blow-by gas flows through the gas inlet 11 of the intake housing 10 and flows into the first cyclone 25 through the intake passage 21 and the oil is separated from the blow by gas in the first cyclone 25.

The filtered blow-by gas is exhausted from the gas exit 22 of the first cyclone 25, flows into the exhaust housing 30 and is exhausted through the gas outlet 31 of the exhaust housing 30. The separated oil is exhausted through the oil outlet 23 of the first cyclone 25. When one cyclone 20 is used, for example, filtering rate of the blow-by gas is about 0-70 l/min.

In various embodiments, when the intake pressure of the engine 60 is slightly less than the atmospheric pressure as indicated by M2 in FIG. 5, pressure between the exhaust diaphragm 45 and the fourth partition 37 is relatively less than pressure in the exhaust gas outlet 31 of FIG. 4.

Because the intake pressure of the engine 60 is lowered according to increasing RPM of a vehicle and that negative pressure is generated in the exhaust gas outlet 31 so that the exhaust diaphragm 45 rotates to the clockwise direction around the rotating shaft 41 in the drawing. Thus, the intake diaphragm 43 connected to the rotating shaft 41 rotates around the rotating shaft 41 and the intake passage 21 connected to the second cyclone 27 is opened.

Consequently, the blow-by gas flows into the first and second cyclones 25 and 27 through the opened intake passage 21.

The oil in the blow-by gas is separated in the first and second cyclones 25 and 27 and separated oil is exhausted through the oil outlets 23 of the first and second cyclone 25 and 27. The filtered blow-by gas is exhausted from the gas exit 22 of the first and second cyclones 25 and 27, flows into the exhaust housing 30 and is exhausted through the gas outlet 31 of the exhaust housing 30. When two cyclones 20 are used, for example, filtering rate of the blow-by gas is about 70-140 l/min.

In various embodiments, when the intake pressure of the engine 60 is sufficiently less than the atmospheric pressure as indicated by M3 in FIG. 5, the exhaust diaphragm 45 rotates to the clockwise direction around the rotating shaft 41 in the drawing. Thus, the intake diaphragm 43 connected to the rotating shaft 41 rotates around the rotating shaft 41 and the intake passage 21 connected to the third cyclone is opened.

Consequently, the blow-by gas flows into the first, second, and third cyclones 25, 27, and 29 through the opened intake passage 21.

The oil in the blow-by gas is separated in the first, second, and third cyclones 25, 27, and 29 and separated oil is exhausted through the oil outlets 23 of the first, second, and third cyclones 25, 27, and 29.

The filtered blow-by gas is exhausted from the gas exit 22 of the first, second, and third cyclones 25, 27, and 29, flows into the exhaust housing 30 and is exhausted through the gas outlet 31 of the exhaust housing 30.

When three cyclones 20 are used, for example, filtering rate of the blow-by gas is about 110-150 l/min. Then the blow-by gas exhausted through the gas outlet 31 flows into the intake manifold 62 of the engine 60 and reburned. And then, when the negative pressure is lowered, the intake diaphragm and exhaust diaphragms 43 and 45 are returned to the original position by elastic force of the return spring 47. That is, the return spring 47 supplies elastic restoring force to the exhaust diaphragm 45 and the exhaust diaphragm 45 returns around the rotating shaft 41. Thus, the intake diaphragm 43 also returns around the rotating shaft 41.

In the oil separation apparatus for blow-by gas according to various embodiments of the present invention, a number of cyclones to be used can be modulated according to intake pressure changes so that separation efficiency can be enhanced. In the oil separation apparatus for blow-by gas according to various embodiments of the present invention, the blow-by gas oil separation apparatus 1 is applicable to various kind vehicles with simple design changes in the control unit 40, configuring the intake diaphragm and exhaust diaphragm 43 and 45 and changing in modulus of elasticity of the return spring 47 so that development costs and period can be reduced.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An oil separation apparatus for blow-by gas, which is connected to a crank case of an internal combustion engine, is supplied with a blow-by gas, separates oil from the blow-by gas, and supplies the blow-by gas to the internal combustion engine, the oil separation apparatus comprising:
    an intake housing provided with a gas inlet for the blow-by gas to be drawn therein;
    a plurality of cyclone, each of which is formed as a cone, is disposed about the intake housing and communicates with the intake housing through a respective intake passage and separates oil from the blow-by gas, wherein a gas exit is formed to an upper side of each cyclone for discharging the blow-by gas and an oil outlet is formed to a lower side of each cyclone for discharging the separated oil;
    an exhaust housing coupled to the intake housing, the exhaust housing which is provided with a gas outlet, is communicating with the gas exit through an exhaust passage connecting the gas outlet and the exhaust housing, and discharges the blow-by gas through the gas outlet;
    a control unit which is disposed with the intake and exhaust housing and selectively opens the intake and exhaust passages according to an intake pressure of the engine;
    wherein the control unit comprises;
    a rotating shaft rotatably disposed with the intake and exhaust housing;
    an intake diaphragm which is integrally connected to the rotating shaft and disposed within the intake housing, the intake diaphragm being configured to electively open the intake passages;
    an exhaust diaphragm which is integrally connected to the rotating shaft and disposed within the exhaust housing and rotates around the rotating shaft simultaneously with the rotating shaft and the intake diaphragm according to the intake pressure of the engine, the exhaust diaphragm being configured to electively open the exhaust passage; and
    a return spring which is disposed to the rotating shaft and supplies restoring force to the intake diaphragm and exhaust diaphragm.

2. The oil separation apparatus of claim 1, wherein a first end portion of the intake passage is configured and dimensioned to be connected to the respective cyclone in a tangential direction thereof respectively.

3. The oil separation apparatus of claim 2, wherein a second end portion of the intake passage is configured and dimensioned to be connected to the intake housing in a tangential direction thereof respectively.

4. The oil separation apparatus of claim 1, wherein a second end portion of the intake passage is configured and dimensioned to be connected to the intake housing in a tangential direction thereof respectively.

5. The oil separation apparatus of claim 1, wherein cross sections of the intake diaphragm and exhaust diaphragm are formed by a circular arc; and
    the intake diaphragm is disposed in predetermined angle from the exhaust diaphragm around the rotating shaft.

6. The oil separation apparatus of claim 1, wherein a mounting groove is formed to the rotating shaft for configuring the return spring.

7. The oil separation apparatus of claim 1, wherein the cyclones comprise:
    a first cyclone parallel to the gas inlet;
    a second cyclone vertical to the first cyclone; and
    a third cyclone vertical to the second cyclone,
    wherein the first, second and third cyclones are disposed around the intake housing.

8. The oil separation apparatus of claim 7, wherein a first intake passage connected to the intake housing is connected to the first cyclone in a tangential direction thereof, a second intake passage connected to the intake housing is connected to the second cyclone in a tangential direction thereof, and a third intake passage connected to the intake housing is connected to the third cyclone in a tangential direction thereof.

9. The oil separation apparatus of claim 8, wherein the first, second and third intake passages are connected to the intake housing in a tangential direction thereof respectively.

10. The oil separation apparatus of claim 7, wherein a first intake passage connected to the first cyclone, a second intake passage connected to the second cyclone, and a third intake passage connected to the third cyclone are connected to the intake housing in a tangential direction thereof respectively.

11. The oil separation apparatus of claim 7, wherein a first partition, which connects the gas inlet and the intake passage connected to the third cyclone, and a second partition, which connects the gas inlet and a rotating shaft, are formed in the intake housing.

12. The oil separation apparatus of claim 1, wherein a third partition, which is formed as a cylinder and communicated with the gas outlet, and a fourth partition, which connects a rotating shaft and a side of the third partition, are formed in the exhaust housing.

* * * * *